(12) United States Patent
Brandt

(10) Patent No.: US 10,874,485 B2
(45) Date of Patent: Dec. 29, 2020

(54) COMPARING A CURRENT DENTAL SETUP WITH A SERIES OF PRESET DENTAL SETUPS

(71) Applicant: 3SHAPE A/S, Cophenhagen K (DK)

(72) Inventor: Henrik John Brandt, Copenhagen NV (DK)

(73) Assignee: 3SHAPE A/S, Copenhagen K (DK)

( * ) Notice: Subject to any disclaimer, the term of this patent is extended or adjusted under 35 U.S.C. 154(b) by 155 days.

(21) Appl. No.: 16/079,306

(22) PCT Filed: Feb. 24, 2017

(86) PCT No.: PCT/EP2017/054303
§ 371 (c)(1),
(2) Date: Aug. 23, 2018

(87) PCT Pub. No.: WO2017/144652
PCT Pub. Date: Aug. 31, 2017

(65) Prior Publication Data
US 2019/0053875 A1  Feb. 21, 2019

(30) Foreign Application Priority Data
Feb. 24, 2016  (DK) .................................. 2016 70102

(51) Int. Cl.
*A61C 7/00* (2006.01)
*A61C 7/08* (2006.01)
(Continued)

(52) U.S. Cl.
CPC ................ *A61C 7/002* (2013.01); *A61C 7/08* (2013.01); *A61C 9/004* (2013.01); *A61C 9/0046* (2013.01); *A61C 19/05* (2013.01)

(58) Field of Classification Search
None
See application file for complete search history.

(56) References Cited

U.S. PATENT DOCUMENTS

| 6,488,499 B1 | 12/2002 | Miller |
| 2005/0192835 A1 | 9/2005 | Kuo et al. |

(Continued)

FOREIGN PATENT DOCUMENTS

| CA | 2 820 539 A1 | 4/2009 |
| WO | 2006/084079 A2 | 8/2006 |
| WO | 2008/149222 A2 | 12/2008 |

OTHER PUBLICATIONS

International Search Report (PCT/ISA/210) dated May 17, 2017, by the Europe Patent Office as the International Searching Authority for International Application No. PCT/EP2017/054303.

(Continued)

*Primary Examiner* — Vikkram Bali
(74) *Attorney, Agent, or Firm* — Buchanan Ingersoll & Rooney P.C.

(57) ABSTRACT

A method that generally relates to comparing a current dental setup with a series of preset dental setups. More particularly a method where this comparison is used to determine which aligner should be used from a series of dental aligners for proceeding with an orthodontic treatment. Each aligner in the series of previously manufactured aligners is provided for moving the at least one tooth in the patient's teeth from one dental setup to a subsequent dental setup.

9 Claims, 2 Drawing Sheets

(51) Int. Cl.
    *A61C 9/00*         (2006.01)
    *A61C 19/05*       (2006.01)

(56)                 References Cited

U.S. PATENT DOCUMENTS

| | | | |
|---|---|---|---|
| 2007/0128574 A1 | 6/2007 | Kuo et al. | |
| 2008/0182220 A1* | 7/2008 | Chishti | A61C 7/00 433/24 |
| 2008/0248443 A1* | 10/2008 | Chishti | A61C 7/00 433/24 |
| 2008/0305453 A1* | 12/2008 | Kitching | A61C 7/00 433/24 |
| 2010/0151404 A1 | 6/2010 | Wu et al. | |
| 2012/0270173 A1* | 10/2012 | Pumphrey | A61C 7/08 433/6 |
| 2013/0029283 A1* | 1/2013 | Matty | A61C 7/002 433/3 |
| 2016/0310235 A1* | 10/2016 | Derakhshan | A61C 7/002 |
| 2017/0007359 A1* | 1/2017 | Kopelman | B33Y 80/00 |
| 2018/0250099 A1* | 9/2018 | Lai | A61C 7/08 |
| 2019/0298493 A1* | 10/2019 | Mason | A61C 7/002 |

OTHER PUBLICATIONS

Written Opinion (PCT/ISA/237) dated May 17, 2017, by the Europe Patent Office as the International Searching Authority for International Application No. PCT/EP2017/054303.

\* cited by examiner

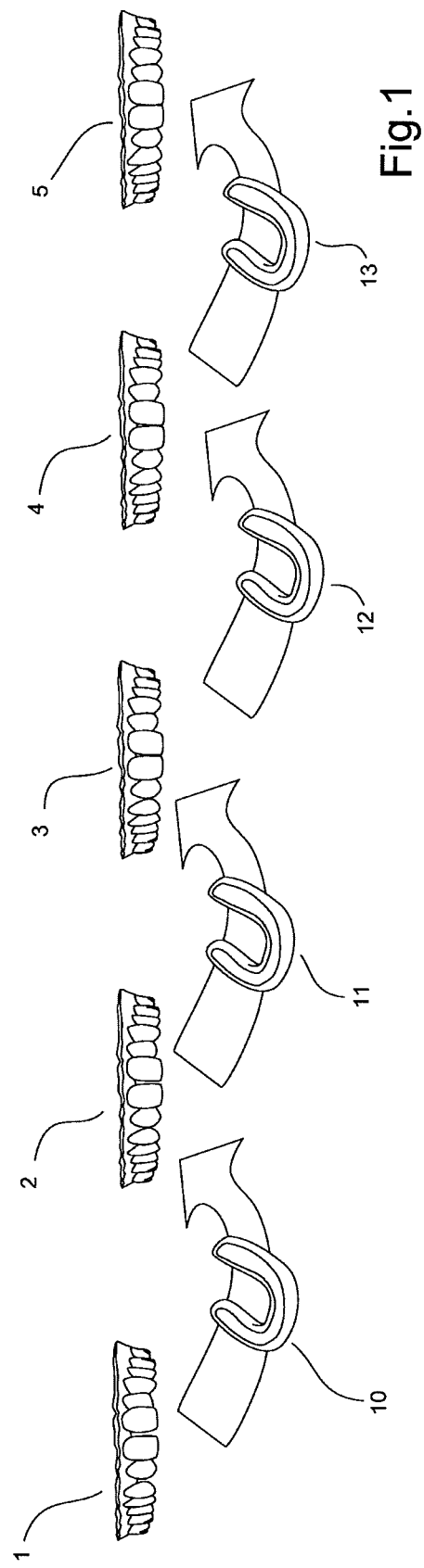
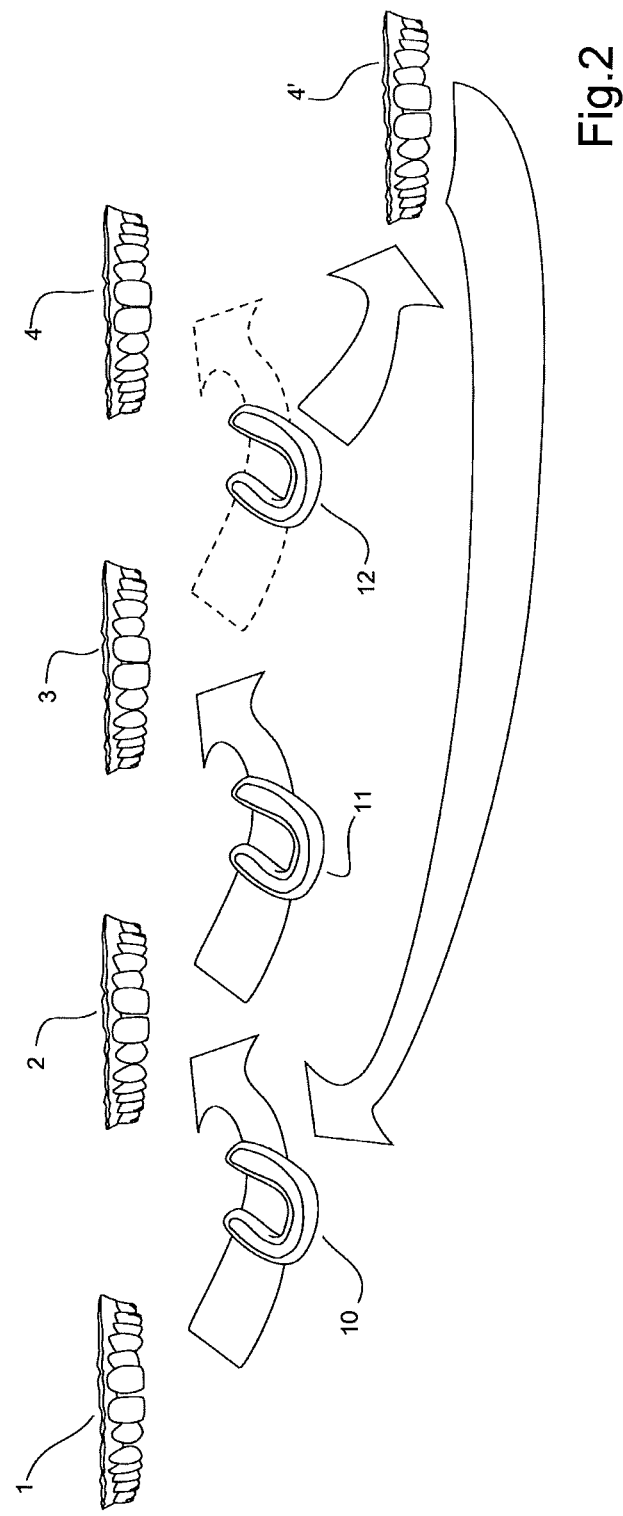
Fig.1
Fig.2

COMPARING A CURRENT DENTAL SETUP WITH A SERIES OF PRESET DENTAL SETUPS

FIELD OF THE INVENTION

This invention generally relates to comparing a current dental setup with a series of preset dental setups. More particularly a method is disclosed where this comparison is used to select an aligner from a series of previously manufactured dental aligners and use that aligner to proceeding with an orthodontic treatment.

BACKGROUND OF THE INVENTION

It has become very common today to use dental aligners for orthodontic treatment as an alternative to the brackets and braces traditionally used.

In order to supply the correct type of aligners a treatment plan is setup for moving the teeth from an initial dental setup to a final dental setup via a number of intermediate dental setups. A series of aligners is subsequently designed and manufactured based on the dental setups for moving the teeth according to the treatment plan. When reaching the respective dental setups a new aligner is used in order to proceed through the treatment.

However, it happens that the actual treatment deviates from the planned treatment. For example, in cases where the patient did not wear the aligner sufficiently or correctly the dental setup will end up deviating from the planned treatment. It is common in such cases to do a new treatment plan and manufacture new aligners. However, this is time consuming and costly.

Accordingly, it is desirable to be able to reuse the treatment plan and the aligners already provided in order to proceed with the treatment.

SUMMARY

Disclosed is a method for selecting an aligner from a series of previously manufactured aligners for moving at least one tooth in a patient's set of teeth from an initial dental setup to a final dental setup via a sequence of intermediate dental setups, and where each aligner in the series of previously manufactured aligners is provided for moving the at least one tooth in the patient's teeth from one dental setup to a subsequent dental setup, wherein the method comprises a digital workflow for:
  obtaining a digital 3D representation of a patient's set of teeth,
  obtaining a digital treatment plan comprising an initial dental setup, an expected current dental setup and at least two intermediate dental setups representing the dental setup between the initial dental setup and the expected current dental setup and where at least two aligners are provided in the series of previously manufactured aligners for moving the at least one tooth to the respective at least two intermediate dental setups, and
  digitally determine which of the at least two intermediate dental setups have a closest match to the digital 3D representation of a patient's set of teeth,
wherein the method further comprises selecting an aligner from the series of previously manufactured aligners based on the closest match.

By providing means for backtracking and selecting an aligner from a series of aligners that is best suited for proceeding orthodontic treatment both time and money can be saved since the patient can be reintroduced into correct treatment immediately without having to order a completely new series of aligners.

Determining the closest match can be done in a number of ways, for example by using an iterative closest point (ICP) algorithm which is a well known method for comparing 3D models.

Typically, the dental setups are provided as 3D models representing the patient's teeth in the respective dental setups, which for example facilitates using algorithms such as the ICP, since these 3D models can be used to digitally determine the closest match of the 3D representation of the patient's set of teeth.

The specific aligner is selected based on where in the treatment plan the patient currently is.

Accordingly, in one embodiment the selected aligner is the aligner from the series of previously manufactured aligners, which is adapted to move the patient's set of teeth from the closest match dental setup to the subsequent dental setup.

In another embodiment the selected aligner is the aligner from the series of previously manufactured aligners, which is adapted to move the patient's set of teeth to the closest match dental setup.

In some cases the patient may have moved so far away from the planned treatment that it is not sufficient to simply revert back to an existing aligner. In such a case it may be a solution to manufacture a correctional aligner for moving the at least one tooth in the patient's teeth to a temporary dental setup, said temporary dental setup interposes the at least two immediate dental setups.

Subsequently, after the at least one tooth in the patient's teeth is moved to the temporary dental setup an existing aligner from the series of previously manufactured aligners can be selected to proceed the planned treatment.

In another aspect the invention relates to a computer implemented method for determining the correct stage of a planned treatment, wherein the method comprises:
  obtaining a digital 3D representation of a patient's set of teeth,
  obtaining a digital treatment plan comprising an initial dental setup, an expected current dental setup and at least two intermediate dental setups representing the dental setup between the initial dental setup and the expected current dental setup and where at least two aligners are provided in the series of previously manufactured aligners for moving the at least one tooth to the respective at least two intermediate dental setups, and
  digitally determine which of the at least two intermediate dental setups have a closest match to the digital 3D representation of a patient's set of teeth.

BRIEF DESCRIPTION OF THE DRAWINGS

The above and/or additional objects, features and advantages of the present invention, will be further discussed by the following illustrative and non-limiting detailed description of embodiments of the present invention, with reference to the appended drawings, wherein:

FIG. 1 shows a schematic overview of an orthodontic treatment following the intended treatment plan, FIG. 2 shows a schematic overview of an orthodontic treatment, which is corrected according to one embodiment of the invention.

DETAILED DESCRIPTION

Figure 3:
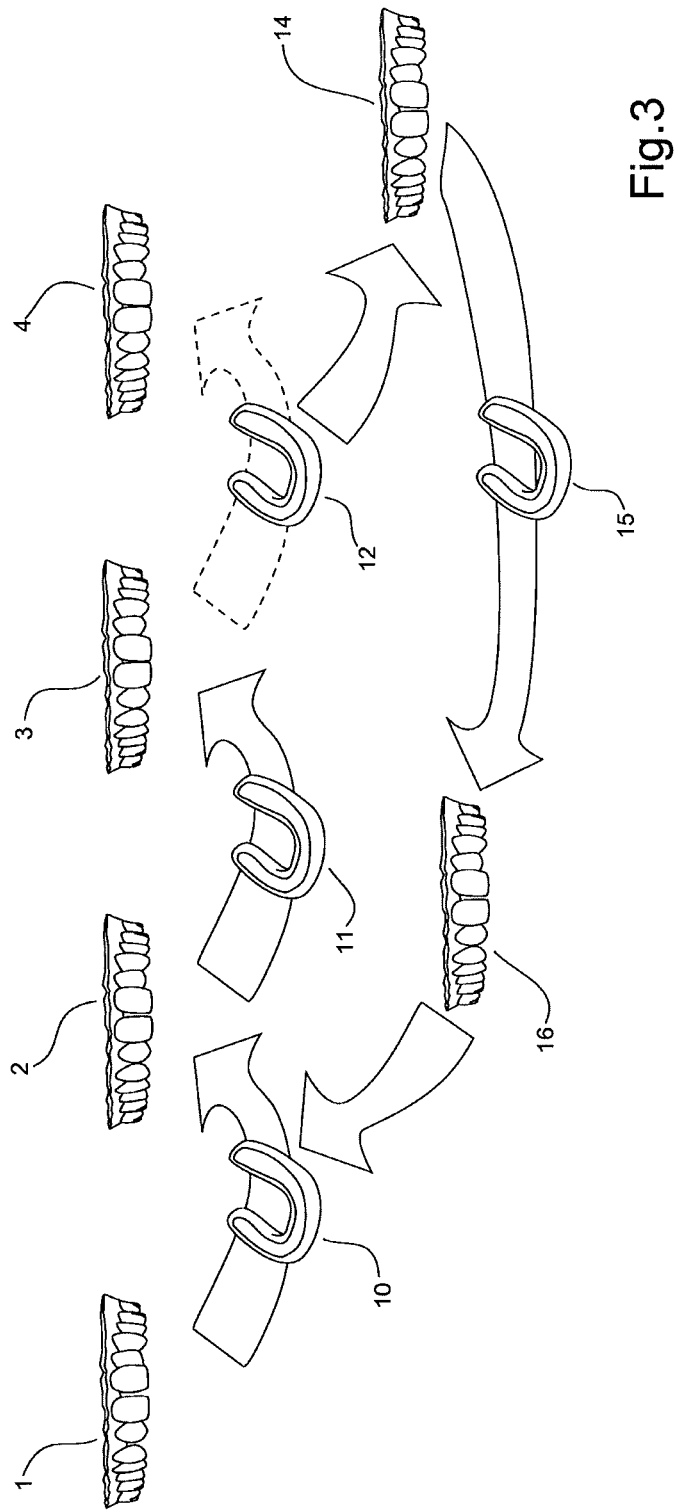
FIG. 3 shows a schematic overview of an orthodontic treatment, which is corrected according to another embodiment of the invention.

In the following description, reference is made to the accompanying figures, which show by way of illustration how the invention may be practiced.

FIG. 1 shows a treatment plan of an orthodontic treatment where the dental setup is changed from an initial dental setup 1 to a final dental setup 5 by using a series of dental aligners 10, 11, 12 and 13 to move the teeth through a number of intermediate dental setups (in this case three) 2, 3 and 4 to the final dental setup 5. Each aligner is designed to move the teeth of patient from one dental setup to a subsequent dental setup, e.g. the aligner 10 is designed to move the teeth from the initial dental setup 1 to the first intermediate dental setup 2.

However, in some cases the treatment does not go according to the treatment plan and as shown in FIG. 2 teeth end up in an undesired dental setup 4' instead of the planned third intermediate dental setup 4.

In such cases it has been common to simply to a new treatment plan and design and manufacture a new set of aligners.

However, by comparing the undesired dental setup with the dental setups designed for the treatment plan it is in most cases possible to iterate back through the treatment plan and find an aligner that was previously manufactured and reuse this in order to bring the patient back on the treatment plan.

For example, as shown in FIG. 2 it is determined by digitally comparing the undesired dental setup 4' with the planned dental setups that the undesired dental setup lies between the initial dental setup and the first intermediate dental setup and has a closest match with the first intermediate dental setup 2. In this case the patient can be brought back into the original treatment plan by using the first aligner 10 in order to move from the undesired dental setup 4' to the first intermediate dental setup.

In some cases, as shown in FIG. 3, it may turn out that an undesired dental setup 14 has moved so far off the treatment plan that it is necessary to produce a correctional aligner 15 in order to bring the teeth back to a suitable temporary dental setup 16. From the temporary dental setup 16 the first aligner 10 can be used to bring the dental setup back into the treatment plan. As can be understood, it is still an advantage to only have to manufacture one additional aligner as an alternative to a whole new set of aligners.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

The invention claimed is:

1. A method for selecting an aligner from a series of previously manufactured aligners for moving at least one tooth in a patient's set of teeth from an initial dental setup to a final dental setup via a sequence of intermediate dental setups, and where each aligner in the series of previously manufactured aligners is provided for moving the at least one tooth in the patient's teeth from one dental setup to a subsequent dental setup,
wherein the method comprises a digital workflow for:
  obtaining a digital 3D representation of a patient's current dental setup,
  obtaining a digital treatment plan comprising the initial dental setup, the final dental setup, and at least two intermediate dental setups representing dental setups between the initial dental setup and the final dental setup, and where at least two aligners are provided in the series of previously manufactured aligners for moving the at least one tooth to a respective one of the at least two intermediate dental setups, and
  digitally determining which one of the at least two intermediate dental setups has a closest match to the digital 3D representation of the patient's current dental setup,
wherein the method further comprises selecting an aligner from the series of previously manufactured aligners based on the closest match.

2. A method according to claim 1, wherein the selected aligner is the aligner from the series of previously manufactured aligners, which is adapted to move the patient's set of teeth from the closest match dental setup to the respective subsequent dental setup.

3. A method according to claim 1, wherein the selected aligner is the aligner from the series of previously manufactured aligners, which is adapted to move the patient's set of teeth to the closest match dental setup.

4. A method according to claim 1, wherein a correctional aligner is manufactured for moving the at least one tooth in the patient's teeth to a temporary dental setup, said temporary dental setup interposes the at least two immediate dental setups.

5. A computer implemented method for determining the correct stage of a planned treatment, wherein the method comprises:
  obtaining a digital 3D representation of a patient's current dental setup,
  obtaining a digital treatment plan comprising the initial dental setup, the final dental setup, and at least two intermediate dental setups representing dental setups between the initial dental setup and the final dental setup, and where at least two aligners are provided in the series of previously manufactured aligners for moving the at least one tooth to a respective one of the at least two intermediate dental setups, and
  digitally determining which one of the at least two intermediate dental setups has a closest match to the digital 3D representation of the patient's current dental setup.

6. A method for selecting an aligner from a series of previously manufactured aligners for moving at least one tooth in a patient's set of teeth from an initial dental setup in accordance with a digital treatment plan via a sequence of intermediate dental setups, and where each aligner in the series of previously manufactured aligners is provided for moving the at least one tooth in the patient's teeth from one dental setup to a subsequent dental setup,
wherein the method comprises a digital workflow for:
  obtaining a digital 3D representation of a patient's current dental setup,
  obtaining the digital treatment plan comprising the initial dental setup and at least two intermediate dental setups representing dental setups, and where at least two aligners are provided in the series of previously manufactured aligners for moving the at least one tooth to a respective one of the at least two intermediate dental setups, and digitally determining which one of the at least two intermediate dental setups has a closest match to the digital 3D representation of the patient's current dental setup, wherein the method further comprises selecting an aligner from the series of previously manufactured aligners based on the closest match.

7. A method according to claim 6, wherein the selected aligner is the aligner from the series of previously manufactured aligners, which is adapted to move the patient's set of teeth from the closest match dental setup to the respective subsequent dental setup.

8. A method according to claim 6, wherein the selected aligner is the aligner from the series of previously manufactured aligners, which is adapted to move the patient's set of teeth to the closest match dental setup.

9. A method according to claim 6, wherein a correctional aligner is manufactured for moving the at least one tooth in the patient's teeth to a temporary dental setup, said temporary dental setup interposes the at least two immediate dental setups.

\* \* \* \* \*